April 23, 1940.  R. G. LE TOURNEAU ET AL  2,198,085
APPARATUS FOR APPLYING FLUX TO WELDING ROD
Filed Feb. 23, 1938
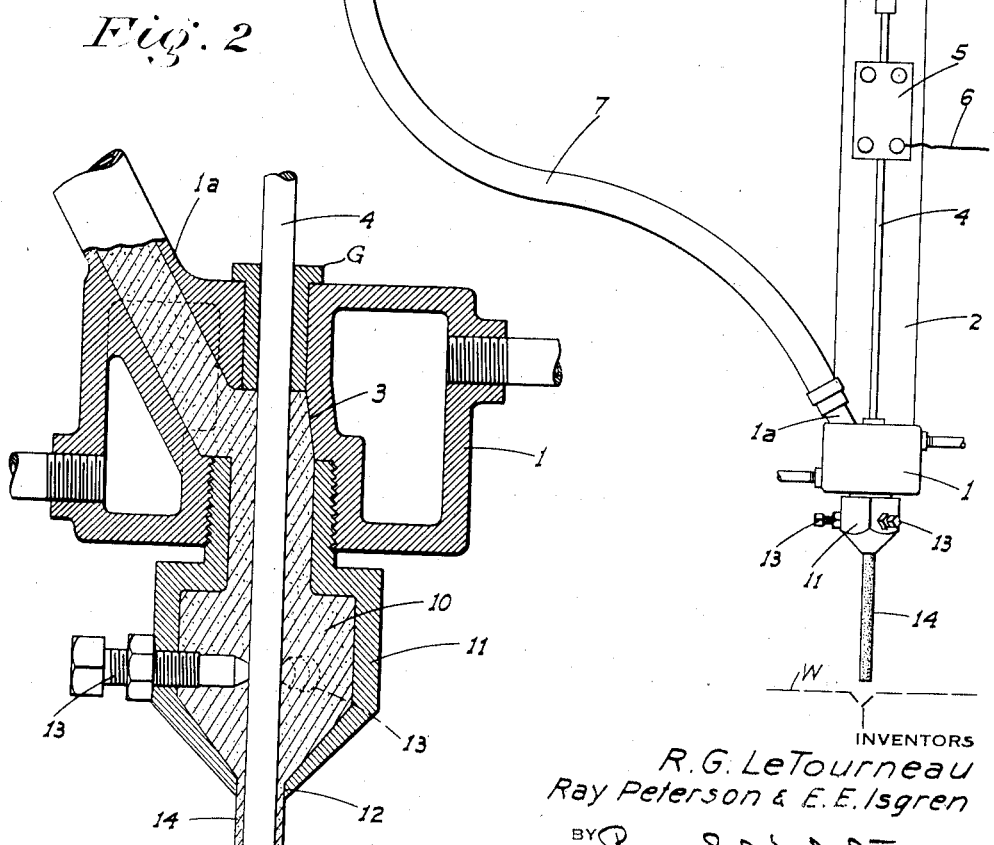
INVENTORS
R. G. LeTourneau
Ray Peterson & E. E. Isgren
ATTORNEY Patented Apr. 23, 1940

2,198,085

UNITED STATES PATENT OFFICE 2,198,085

APPARATUS FOR APPLYING FLUX TO WELDING ROD

Robert G. Le Tourneau, Ray Peterson, and Elmer E. Isgren, Peoria, Ill., assignors to R. G. Le Tourneau, Inc., a corporation of California Application February 23, 1938, Serial No. 192,014

1 Claim. (Cl. 18—13)

This invention relates to electric arc welding, and particularly to that type of welding in which the welding metal is itself one of the electrodes of the welding circuit, being usually in the form of a rod. The invention also relates particularly to automatic welding machines, in which the welding rod is fed to the work at a speed approximately equal to the rate of consumption or transfer of the rod to the weld. It is of course essential that oxygen be kept from the heated electrode and the weld as it is being formed, and this is done by means of a combustible flux which upon burning, generates a gas about the weld, excluding the oxygen therefrom.

At present, this flux is applied to the rod at the factory, and forms a somewhat hard sheath which must be slit when being used in order to bare the rod so that the necessary electrical connection with the welding current may be made. This however has not proved satisfactory. For one thing, it is hard to obtain the necessary positive and continuous electrical contact with the rod.

Another objectionable feature is that the current is apt to jump from the rod at the slit instead of from the actual end area of the rod. This will give an uneven weld, or one which deviates from the intended path along the work and to follow which the work and rod are set.

It is therefore the principal object of our invention to improve the application of the flux to the welding rod over present practice in such a manner that the flux is disposed about the rod as it is fed, in the form of a continuous sheath, and from a point beyond the point of contact with the welding current to the welding end of the rod. By this means, there is no break in the flux sheath and the objectionable side jumping of the current is eliminated.

Also, there is never any difficulty in making the desired positive electrical connection or contact with the rod.

A further object is to provide means for applying the flux so that it is of even thickness about the rod, thus further obviating the possibility of a side jump of the current and assuring the generation of the oxygen excluding gases evenly all about the rod. Also, the possibility of the flux becoming overheated and burning ahead of time is avoided.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claim.

In the drawing similar characters of reference indicate corresponding parts in the several views:

Figure 1 is a side elevation of our improved flux applying equipment.

Figure 2 is an enlarged sectional view of the sheath forming unit of the equipment.

Referring now more particularly to the characters of reference on the drawing, I denotes a water jacketed flux intake body secured on the lower end of an upright frame member 2 of the automatic welding machine. This body is provided with a central vertical bore 3 of considerably greater diameter than the welding rod 4, which projects through the body from above.

A guide gland G for the rod is removably mounted in the body above and concentric with the bore 3, so that the same body may be used with rods of different diameters within the range of the device by merely changing the gland.

The rod, a suitable distance above the body, projects through a contact box 5 where sliding connection is made with a welding current wire 6. The rod is fed downwardly toward the work W from above the box at a controlled speed by suitable means which is preferably that shown in our copending application Serial No. 192,930 filed February 28, 1938.

A lateral passage member 1a on the body communicates with the bore 3 on one side and is connected by a conduit 7 with the bottom of a cylindrical flux supply tank 8. A plunger 9 rests on the flux 10 in said tank and by air pressure or other suitable means exerts a constant force on the flux.

Depending from the body is a member 11 forming an extruding chamber open at both ends and through which the rod projects. At its upper end, the member is in communication with the bore 3 and surrounds the rod with considerable clearance but less than that afforded by the main portion of said member. At its lower end, the member is formed with an outlet 12 about ⅛ inch greater in diameter than the rod 4, the interior surface of the member sloping gradually down to said outlet. In order to maintain the rod accurately centered in the outlet, a plurality of set screws 13 are mounted in the sides of the member in radiating relation to the rod and project across the extruding chamber to engage the rod without binding the same. In order to facilitate cleaning out, the chamber member is preferably made separate from the body 1. This also enables chambers of different outlet sizes to be used with the one body, so as to accommodate rods of different diameters while retaining the same actual clearance between the rod and outlet.

In operation it will be seen that the flux is constantly maintained in and fills the extruding chamber under the pressure exerted by the plunger 9. As the rod is fed down through the outlet 12, a portion of the flux 10 covers and is drawn down with the rod in the form of a continuous cylindrical sheath 14 of even thickness all about the rod. Due to the slope of the extruding chamber toward the outlet, the flux becomes compressed somewhat, so that when it issues from the chamber, it is very compact.

The flux may be of any standard composition, and in any event should contain a quick drying agent such as waterglass.

The tank 8 is set out of the zone of heat, and the water jacketing of the intake body prevents possible solidifying and hardening of the flux before it is deposited on the hot rod.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

Means to apply a plastic coating onto a moving rod comprising a body having a longitudinal bore larger than the rod, a rod guiding gland mounted on the body at one end of the bore, the opposite end of the bore being relatively large and being tapped, a plastic intake passage formed in the body and communicating with the bore at a point between the gland and tapped end, a member separate from the body forming an extruding chamber open from end to end and the central portion of which is relatively large, one end of the member being threaded to removably screw into the tapped end of the body and the opposite end of the member having a relatively small outlet axial with and larger than the bore of the gland and adjustable rod centering elements mounted in the central portion of the member.

ROBERT G. LE TOURNEAU.
RAY PETERSON.
ELMER E. ISGREN.